(12) United States Patent
Gray et al.

(10) Patent No.: US 12,505,487 B1
(45) Date of Patent: Dec. 23, 2025

(54) VEHICLE COLLISION DETECTION SYSTEMS AND METHODS

(71) Applicant: United Services Automobile Association (USAA), San Antonio, TX (US)

(72) Inventors: Emily Margaret Gray, San Antonio, TX (US); Daniel Christopher Bitsis, Jr., San Antonio, TX (US); Qunying Kou, San Antonio, TX (US); Robert Wiseman Simpson, Fair Oaks Ranch, TX (US); Manfred Amann, San Antonio, TX (US); Donnette Moncrief Brown, San Antonio, TX (US); Eric David Schroeder, San Antonio, TX (US); Meredith Beveridge, San Antonio, TX (US); Michael J. Maciolek, Boerne, TX (US); Bobby Lawrence Mohs, San Antonio, TX (US); Brian F. Shipley, Plano, TX (US); Justin Dax Haslam, San Antonio, TX (US); Ashley Raine Philbrick, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 568 days.

(21) Appl. No.: 16/825,560

(22) Filed: Mar. 20, 2020

Related U.S. Application Data

(60) Provisional application No. 62/821,210, filed on Mar. 20, 2019.

(51) Int. Cl.
 *G06Q 40/08* (2012.01)
 *B60Q 9/00* (2006.01)
(Continued)

(52) U.S. Cl.
 CPC ............ *G06Q 40/08* (2013.01); *B60Q 9/008* (2013.01); *B60R 11/04* (2013.01); *G06Q 50/265* (2013.01);
(Continued)

(58) Field of Classification Search
 CPC .... G06Q 40/08; G06Q 40/00; H04N 5/23299; H04N 50/265; H04N 5/2253;
(Continued)

(56) References Cited

U.S. PATENT DOCUMENTS

| | | | |
|---|---|---|---|
| 8,019,629 B1 * | 9/2011 | Medina, III | G06Q 40/08 705/4 |
| 10,504,302 B1 * | 12/2019 | Chavez | H04W 4/90 |

(Continued)

FOREIGN PATENT DOCUMENTS

KR 20040085574 A * 10/2004

OTHER PUBLICATIONS

U.S. Appl. No. 16/778,911, filed Jan. 31, 2020, Yevgeniy Viatcheslavovich Khmelev.

*Primary Examiner* — Divesh Patel
(74) *Attorney, Agent, or Firm* — Fletcher Yoder, P.C.

(57) ABSTRACT

A vehicle collision detection system includes one or more processors configured to receive data from one or more sensors coupled to a vehicle and to analyze the data to detect a collision at the vehicle. In response to the collision at the vehicle, the one or more processors are configured to provide control signals to activate one or more cameras coupled to the vehicle to obtain one or more images of an environment surrounding the vehicle.

20 Claims, 4 Drawing Sheets

(51) Int. Cl.
*B60R 11/04* (2006.01)
*G06Q 50/26* (2012.01)
*G06V 20/56* (2022.01)
*H04N 7/18* (2006.01)
*H04N 23/54* (2023.01)
*H04N 23/66* (2023.01)
*H04N 23/695* (2023.01)
*H04N 23/90* (2023.01)
*H04W 4/40* (2018.01)

(52) U.S. Cl.
CPC ............... *G06V 20/56* (2022.01); *H04N 7/18* (2013.01); *H04N 23/54* (2023.01); *H04N 23/66* (2023.01); *H04N 23/695* (2023.01); *H04N 23/90* (2023.01); *H04W 4/40* (2018.02)

(58) Field of Classification Search
CPC .... H04N 5/23203; H04N 5/247; H04N 5/225; H04N 7/18; G06V 20/56; G06V 20/50; G06V 20/00; B60Q 9/008; B60Q 9/00; B60R 11/04; B60R 11/00; B60R 2011/004; H04W 4/40
See application file for complete search history.

(56) References Cited

U.S. PATENT DOCUMENTS

| | | | |
|---|---|---|---|
| 10,679,296 B1* | 6/2020 | Devereaux | G06Q 40/03 |
| 2007/0088488 A1* | 4/2007 | Reeves | G07C 5/085 |
| | | | 701/33.4 |
| 2014/0334684 A1* | 11/2014 | Strimling | G06V 20/52 |
| | | | 382/104 |
| 2016/0203656 A1* | 7/2016 | Bhogal | G07C 5/0808 |
| | | | 701/32.2 |
| 2017/0046216 A1* | 2/2017 | Stenneth | G08B 25/016 |
| 2017/0166217 A1* | 6/2017 | Sbianchi | H04B 1/1036 |
| 2019/0244301 A1* | 8/2019 | Seth | G06F 16/73 |

\* cited by examiner

VEHICLE COLLISION DETECTION SYSTEMS AND METHODS

CROSS-REFERENCE TO RELATED APPLICATION

This application claims priority to and the benefit of U.S. Provisional Application No. 62/821,210, entitled "VEHICLE COLLISION DETECTION SYSTEMS AND METHODS," filed Mar. 20, 2019, which is hereby incorporated by reference in its entirety for all purposes.

BACKGROUND

The present disclosure relates generally to systems and methods for use with vehicles. Unfortunately, vehicular collisions are a regular occurrence. In some cases, the results and circumstances of such collisions are disputed. Accordingly, it is now recognized that it would be beneficial to provide improved systems and methods for detecting such collisions.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a vehicle collision detection system includes one or more processors configured to receive data from one or more sensors coupled to a vehicle and to analyze the data to detect a collision at the vehicle. In response to the collision at the vehicle, the one or more processors are configured to provide control signals to activate one or more cameras coupled to the vehicle to obtain one or more images of an environment surrounding the vehicle.

In one embodiment, a vehicle collision detection system includes one or more sensors coupled to a vehicle and one or more remote cameras located remotely from the vehicle. The vehicle collision detection system also includes one or more processors configured to receive data from the one or more sensors, analyze the data to detect a collision at the vehicle, and in response to the collision at the vehicle, provide control signals to activate the one or more remote cameras to obtain one or more images of an environment surrounding the vehicle.

In one embodiment, a method of operating a vehicle collision detection system includes receiving, at one or more processors, data from one or more sensors coupled to a vehicle. The method also includes analyzing, using the one or more processors, the data to detect a collision at the vehicle. The method further includes, in response to the collision at the vehicle and using the one or more processors, providing control signals to activate one or more cameras coupled to the vehicle to obtain one or more images of an environment surrounding the vehicle and to activate one or more remote cameras located remotely from the vehicle to obtain one or more additional images of the environment surrounding the vehicle.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The terminology used herein is for the purpose of describing particular embodiments only and is not intended to be limiting. As used in the description and the appended claims, the singular forms "a," "an" and "the" are intended to include the plural forms as well, unless the context clearly indicates otherwise. It will also be understood that the term "and/or" as used herein refers to and encompasses any and possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, operations, elements, components, and/or groups thereof.

Present embodiments are generally directed to vehicle collision detection systems and methods. More specifically, the present embodiments are generally directed to a vehicle collision detection system that detects a collision at a vehicle and then activates (e.g., automatically activates) one or more monitoring devices (e.g., a camera on the vehicle, a camera that is part of a nearby security system, a data access device) in response to detection of the collision at the vehicle. The vehicle collision detection system may provide an alert (e.g., to a person associated with the vehicle and/or to emergency services) in response to detection of the collision at the vehicle and/or may provide other advantages (e.g., result in lower insurance costs for the vehicle). The vehicle collision detection system may be used while the vehicle is in a parked position (e.g., stationary, with or without occupants in the vehicle) and/or while the vehicle is not in the parked position (e.g., traveling, with or without occupants in the vehicle).

Figure 1:
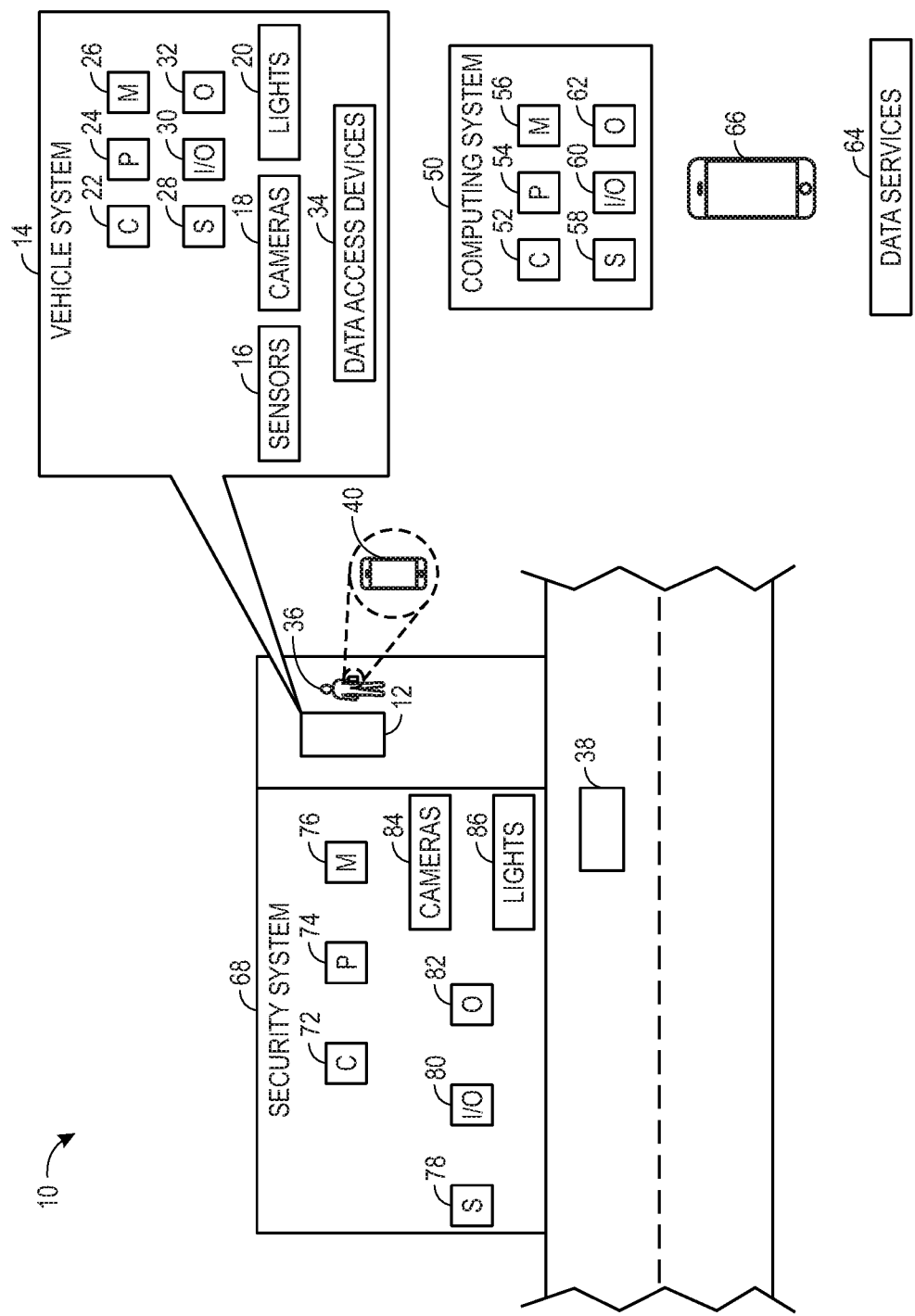
FIG. 1 is a schematic diagram of a vehicle collision detection system with a vehicle parked at a residence, in accordance with an aspect of the present disclosure.

With the foregoing in mind, FIG. 1 is a schematic diagram of a vehicle collision detection system 10 that may be used to detect a collision at a vehicle 12. The vehicle 12 may be an autonomous vehicle or a non-autonomous vehicle. To facilitate detection of the collision at the vehicle 12, the vehicle 12 may include a vehicle system 14 with one or more sensors 16 (e.g., one or more motion sensors, such as accelerometers and/or gyroscopes; one or more impact force sensors, such as one or more load cells, strain gauges, force-sensing resistor; and/or one or more audio sensors, such as a microphone) that generate signals indicative of the collision. As shown, the vehicle system 14 may include other components, such as one or more cameras 18, one or more lights 20, a communication device 22, a processor 24, a memory device 26, a storage device 28, an input/output device 30, and an output device 32 (e.g., a display and/or a speaker).

In operation, the processor 24 may receive the signals from the one or more sensors 16 and may process the signals to determine that the collision occurred. In response to the collision, the processor 24 may instruct activation of the one or more cameras 18 and/or the one or more lights 20 to monitor an environment (e.g., area) around the vehicle 12. The one or more cameras 18 and/or the one or more lights 20 may obtain one or more images (e.g., multiple images; moving image or video) of a nearby object, such as a person 36 that caused the collision (e.g., glass breakage/breakage of a window of the vehicle 12, which may be indicated by a frequency detected by one or more microphone sensors), a witness to the collision, another vehicle 38 driven by the person 36 or driven by a witness to the collision, and/or any other nearby object related to the collision. The one or more cameras 18 may include a rotational camera configured to rotate (e.g., 360 degrees) relative to the vehicle 12 to obtain the one or more images. Additionally or alternatively, the one or more cameras 18 may include a back-up camera mounted on a rear end of the vehicle 12, a forward-facing camera mounted on a front end of the vehicle 12, and/or one or more other cameras positioned at any of a variety of locations on the vehicle 12.

The one or more cameras 18 may have built-in lighting or may have night-vision features to enable use of the one or more cameras 18 during poor lighting conditions (e.g., in a garage; at night). Additionally or alternatively, the one or more cameras 18 may be used in conjunction with the one or more lights 20 that illuminate the environment surrounding the vehicle 12. The activation of the one or more cameras 18 and/or the one or more lights 20 may include turning on (e.g., from an off state to an on state) the one or more cameras 18 and/or the one or more lights 20 to obtain the one or more images. The activation of the one or more cameras 18 may include rotating the camera and/or adjusting the one or more cameras 18 (e.g., changing an orientation of the one or more cameras 18 relative to the vehicle), so as to capture one or more images of the environment surrounding the vehicle 12 and/or relevant information (e.g., one or more images of the person 36 or the vehicle 38 involved in the collision). The one or more cameras 18 and/or the one or more lights 20 may operate continuously or otherwise already be turned on, and in such cases, the activation may include tagging (e.g., time stamping) and/or storing the one or more images obtained by the one or more cameras 18 during a time period around a time of the collision (e.g., one or more images obtained by the one or more cameras 18 during 10 minutes prior to the time of the collision and/or during 10 minutes after the time of the collision), for example. Once the collision is detected, the processor 24 may record the one or more signals, the one or more images, and/or other data related to the collision (e.g., time, date, and/or location of the collision) in the storage device 28. The processor 24 may additionally communicate the one or more signals, the one or more images, and/or the other data related to the collision (e.g., time, date, and/or location of the collision) to another device or system via the communication device 22 (e.g., in response to the collision and collection of the one or more images).

In some embodiments, a data access device 34 that is capable of monitoring the environment surrounding the vehicle 12 for wireless communication signals and obtaining identifying information from these signals may be coupled to the vehicle 12. For example, the data access device 34 may include one or more radio-frequency (RF) sensors capable of detecting, receiving, and measuring RF signals over a range of different frequencies, including frequencies used by WiFi devices and hotspots, Bluetooth devices, cellular devices and towers, satellite phone devices, satellite-based driver assistance systems (e.g., On-star), citizen's band radio devices, ham radio devices, and very high frequency (VHF) radio devices. More particularly, the data access device 34 may be capable of detecting WiFi or cellular signals and determining identifying information (e.g., a media access control [MAC] address, cellular node address, international mobile subscriber identity (IMSI), Temporary Mobile Subscriber Identity [TMSI], or other suitable identifiers) from these signals. In certain embodiments, the data access device 34 may include or mimic a WiFi hotspot, a cellular tower, or another suitable host device that logs WiFi or cellular devices that attempt to communicate with the data access device 34.

In operation, the data access device 34 may scan (e.g., continuously, periodically, and/or in response to the collision) for RF signals and determine the identifying information. Such techniques may provide identifying information about the nearby object related to the collision. For example, in the illustrated embodiment, the data access device 34 may obtain identifying information from a mobile device 40 carried by the person 36 that broke a window of the vehicle 12 or otherwise collided with the vehicle 12. Once detected, the identifying information and/or other data related to the identifying information (e.g., time, date, and/or location for the RF signals) may be recorded (e.g., in the storage device 28). The identifying information and/or other data related to the identifying information may additionally be communicated to another device or system (e.g., via the communication device 22, in response to the collision and collection of the identifying information).

As shown, the vehicle system 14 may be in communication with a computing system 50, which may include a communication device 52, a processor 54, a memory device 56, a storage device 58, an input/output device 60, and an output device 62 (e.g., a display, a speaker). The vehicle system 14 may provide various relevant data, such as the one or more signals obtained by the one or more sensors 16, the one or more images obtained by the one or more cameras 18, other data related to the collision (e.g., time, date, and/or location of the collision), the identifying information obtained by the data access device 34, and/or other data related to the identifying information (e.g., time, date, and/or location for the RF signals) to the processor 54 of the computing system 50 (e.g., via the communication devices 22, 52).

The processor 54 of the computing system 50 may be configured to process and/or instruct storage of the data. For example, the processor may be configured to process the one or more signals from the one or more sensors 16 to determine a type of collision (e.g., impact from another vehicle; a broken window), a location of the collision (e.g., a rear end, a front end, or a side of the vehicle 12), a severity of the collision (e.g., an amount of force or motion imparted on the vehicle 12 due to the collision), and/or other characteristics related to the collision (e.g., a response of the vehicle 12, such as a rollover motion of the vehicle 12). The processor 54 may be configured to process the one or more images (e.g., via optical character recognition [OCR]) to identify a license plate number of another vehicle in the vicinity of the vehicle 12 (e.g., the vehicle 38). In some embodiments, the processor 54 may be configured to access data services 64 to look up the license plate number to identify characteristics of the other vehicle 38 and/or characteristics of a person associated with the other vehicle 38 (e.g., accident history, whether the other vehicle has been reported as stolen, the person's name and address, the person's criminal history). As used herein, the person associated with the vehicle may be an owner of the vehicle, a lessee of the vehicle, a driver of the vehicle, or the like.

The processor 54 may also be configured to process the identifying information. In some embodiments, the processor 54 may be configured to access data services 64 to identify the person in the vicinity of the vehicle 12 (e.g., the person 36) and/or to identify characteristics of the person (e.g., the person's name and address, the person's criminal history). The data services 64 may include a local crime data service, an insurance claims data service, a news source that may be updated in real time or near real time (e.g., news websites, social media websites), and/or information collection organizations that acquire data, for example.

In certain embodiments, the processor 54 may instruct the communication device 52 to send an alert to a person associated with the vehicle 12 (e.g., via a mobile device 66), to emergency services, and/or to other people or entities. The alert may be sent in response to the detection of the collision and/or in response to other factors (e.g., determination that the collision is severe; determination that the other vehicle 38 has been reported as stolen or that the person 36 has an outstanding warrant). The alert may provide an indication (e.g., text message) of the characteristics related to the collision, the one or more images, the license plate number of the other vehicle 38 in the vicinity of the vehicle 12, the identifying information, and/or any of the other information disclosed above, for example.

As shown in FIG. 1, the vehicle 12 is in a parked position adjacent to a residential property 68 (e.g., a residence of the person associated with the vehicle 12). The residential property 68 may include a security system 70 (e.g., home security system), which may include a communication device 72, a processor 74, a memory device 76, a storage device 78, an input/output device 80, and an output device 82 (e.g., a display, a speaker). The security system 70 may also include one or more cameras 84 (e.g., remote cameras, located remotely from the vehicle 12) and/or one or more lights 86 (e.g., remote lights, located remotely from the vehicle 12).

In operation, upon detection of the collision at the vehicle 12, the security system 70 may be activated. The security system 70 may be activated upon receipt of an activation signal received directly from the vehicle system 14 or received from the computing system 50. For example, the security system 70 may be activated to use the one or more cameras 84 and/or one or more lights 86 to monitor the environment surrounding the vehicle 12 and/or to monitor the environment surrounding the residential property 68 (e.g., to detect the person 36 and/or the vehicle 38). The activation may include turning on (e.g., from an off state to an on state) the one or more cameras 84 and/or the one or more lights 86 to obtain one or more images. The activation may additionally or alternatively include rotating or angling the one or more cameras 84 and/or the one or more lights 86 in a particular manner (e.g., adjusting an orientation; toward a parking area, toward the vehicle 12, toward a road). It should be appreciated that the security system 70 may operate continuously or otherwise already be turned on, and in such cases, the activation may include tagging and/or storing (e.g., in the storage device 78) the one or more images. For example, the security system 70 may store one or more images obtained by the one or more cameras 84 for a time period around a time of the collision (e.g., one or more images obtained by the one or more cameras during 10 minutes prior to the time of the collision and/or during 10 minutes after the time of the collision) upon receipt of the activation signal. The processor 74 may additionally communicate the one or more images to another device or system, such as the computing system 50, via the communication device 72. Thus, in response to the collision, the computing system 50 may receive various types of data from the vehicle system 14 and from the security system 70. The various types of data may include data obtained by the data access device 34 at the vehicle 12. It should be appreciated that the data access device 34 (or an additional data access device 34) may be provided at the residential property 68.

The residential property 68 may be the residence of the person associated with the vehicle 12. The person associated with the vehicle 12 may authorize activation of the security system 70 in response to detection of a collision at the vehicle 12 when the vehicle 12 is in the vicinity of the residential property 68. In some such cases, the computing system 50 may be configured to adjust (e.g., reduce) an insurance cost associated with the vehicle 12 in response to the authorization to activate the security system 70. For example, the insurance cost associated with the vehicle 12 may be higher without the security system 70 as part of the vehicle collision detection system 10, and the insurance cost associated with the vehicle 12 may be lower with the security system 70 as part of the vehicle collision detection system 10. A degree of insurance cost adjustment may vary based on features of the security system 70, such as number and location of the one or more cameras 84, features of the one or more cameras 84 (e.g., night vision), number and location of the one or more lights 86, or the like. For example, a reduction in the insurance cost may be greater when the security system 70 is equipped with more than one night vision camera positioned to obtain images of a parking area of the residential property 68 compared to when the security system 70 includes only one camera without night vision.

Similar benefits (e.g., insurance cost adjustments) may be provided when the person associated with the vehicle 12 authorizes activation of a security system at another property (e.g., another property frequented by the person associated with the vehicle 12, such as a business owned by the person associated with the vehicle 12, a place of employment of the person associated with the vehicle 12, and/or a relative's residence) and/or when the person associated with the vehicle 12 frequents any other property (e.g., owned by a third-party, such as a place of employment, a grocery store, a parking garage, a home of a family member, a home of a friend) having a security system that is authorized to be activated in response to detected collisions. A degree of insurance cost adjustment may vary based on features of these security systems and/or an amount of time (e.g., percentage of time; average over a time period) that the vehicle 12 is within the vicinity of these security systems. For example, a reduction in the insurance cost may be greater when the vehicle 12 is within the vicinity of these security systems for more than 12 hours per day on average over a month period compared to when the vehicle is within the vicinity of these security systems for less than 12 hours per day on average over the month period.

The processors 24, 54, 74 disclosed herein may be any suitable type of computer processor or microprocessor capable of executing computer-executable code. Any of the processors 24, 54, 74 may also include multiple processors that may perform the operations described herein. The memory devices 26, 56, 76 and the storage devices 28, 58, 78 may represent non-transitory computer-readable media (e.g., any suitable form of memory or storage) that may store the processor-executable code used by the processors 24, 54, 74 to perform various techniques described herein. These articles of manufacture may represent computer-readable media (e.g., any suitable form of memory or storage) that may store the processor-executable code used by the processors 24, 54, 74 to perform the presently disclosed techniques. The memory devices 26, 56, 76 and the storage devices 28, 58, 78 may also be used to store the data (e.g., data from the one or more sensors 16, identifying information obtained by the data access device 34, one or more images), various other software applications, and the like. It should be noted that non-transitory merely indicates that the media is tangible and not a signal.

The I/O devices 30, 60, 80 may be interfaces that may couple to other peripheral components such as the one or more sensors 16, input devices (e.g., keyboard, mouse), input/output (I/O) modules, and the like. The output devices 32, 62, 82 may operate to depict indications associated with software or executable code processed by the processors 24, 54, 74. The output devices 32, 62, 82 may be any suitable type of display, such as a liquid crystal display (LCD), plasma display, or an organic light emitting diode (OLED) display, for example. In one embodiment, the output devices 32, 62, 82 may depict or otherwise provide indications related to the collision, the identifying information, the one or more images, or the like. In one embodiment, one or more of the output devices 32, 62, 82 may be an input device. For example, one or more of the output devices 32, 62, 82 may include a touch display capable of receiving inputs from the person associated with the vehicle 12.

Thus, the person may provide inputs via input devices coupled to the I/O devices 30, 60, 80, via the output devices 32, 62, 82, and/or via the mobile device 66 wirelessly coupled to the vehicle collision detection system 10, for example. The inputs may be related to preferences related to activation of the security system 70 (e.g., the time period around the time of the collision to tag and/or store the one or more images), preferences related to alerts (e.g., to the person and/or to emergency services; when to provide the alerts, such as in response to any collision or only in response to collisions with a threshold severity; which information to provide in the alerts), an input to authorize activation of the security system 70 in response to detection of the collision at the vehicle 12, an input to indicate that a collision (or other event for which monitoring using the vehicle collision detection system 10 is desired) has occurred, or the like. The person associated with the vehicle 12 may also provide an input to activate the one or more cameras 18, the one or more lights 20, the data access device 34, and/or features of the security system 70. For example, the person may provide the input to activate the one or more cameras 18 upon the person wanting to use the vehicle collision detection system 10 to monitor the vicinity of the vehicle 12 (e.g., upon the person observing another vehicle traveling at a high rate of speed in the vicinity of the vehicle 12).

It should be noted that the components described above with regard to the vehicle collision detection system 10 are exemplary components and the vehicle collision detection system 10 may include additional or fewer components as shown. Furthermore, the processing steps may be distributed between and/or carried out by any of the processors 24, 54, 74 disclosed herein in any suitable manner. For example, instead of the processor 54, the processor 24 of the vehicle system 14 may process the one or more signals from the one or more sensors 16 and/or provide the alert (e.g., to the person associated with the vehicle 12 and/or the emergency services).

Figure 2:
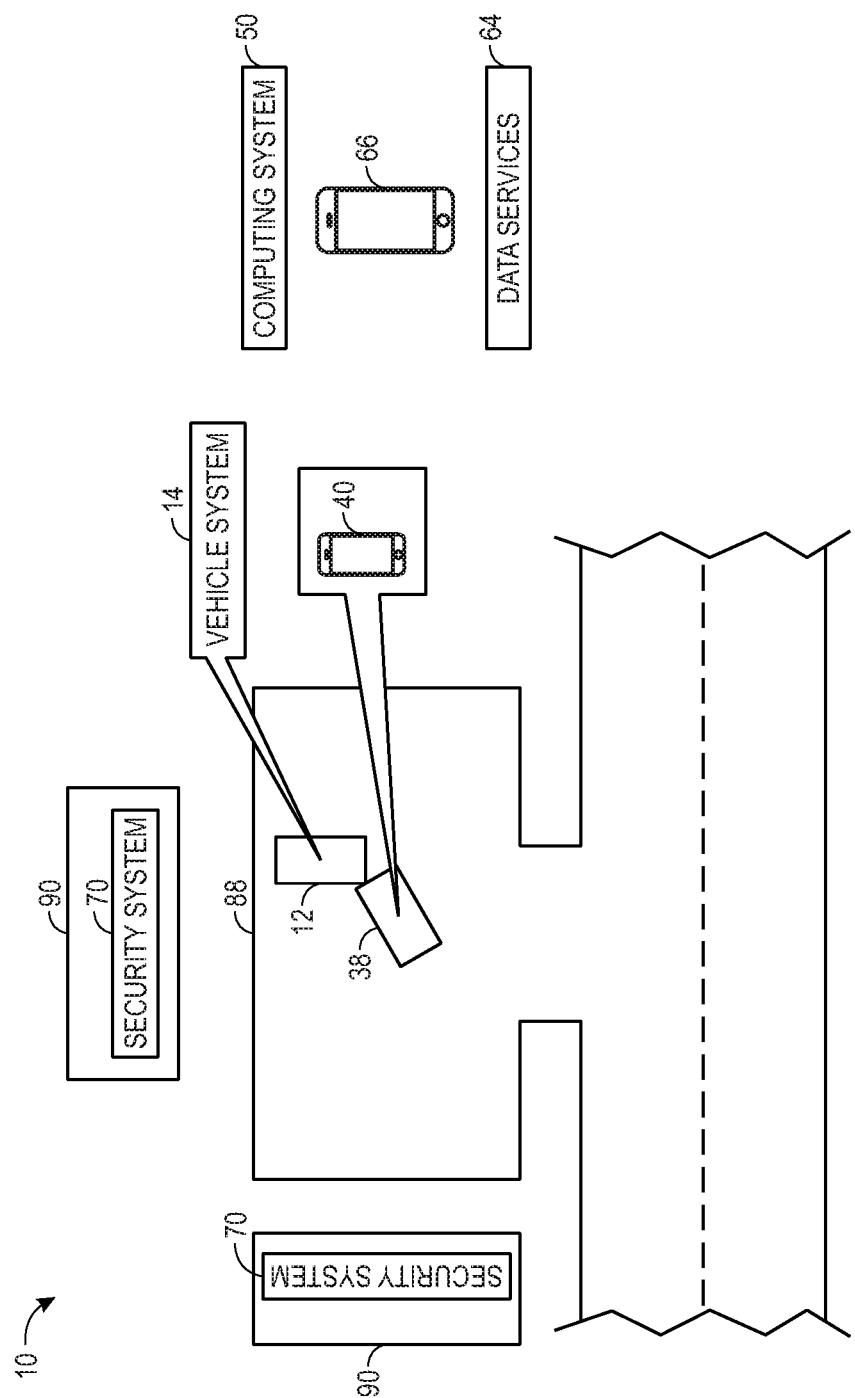
FIG. 2 is a schematic diagram of the vehicle collision detection system with the vehicle parked at another property, in accordance with an aspect of the present disclosure.

FIG. 2 is a schematic diagram of the vehicle collision detection system 10 for use while the vehicle 12 is in a parked position within a parking area 88 (e.g., parking lot) in the vicinity of one or more other properties 90 (e.g., non-residential properties and/or properties owned by a third-party). The vehicle collision detection system 10 may include the vehicle system 14, the computing system 50, and/or one or more security systems 70 at the one or more other properties 90. The vehicle system 14, the computing system 50, and/or the one or more security systems 70 may include some or all of the components illustrated and described with respect to FIG. 1; however, these components are omitted in FIG. 2 for image clarity.

The vehicle system 14 may include the one or more sensors 16 that are configured to detect a collision, such as the collision between the other vehicle 38 and the vehicle 12. In response to detection of the collision, the processor 24 of the vehicle system 14 may activate the one or more cameras 18 and/or the one or more lights 20 to monitor an area around the vehicle 12. Additionally, the processor 24 may record the one or more signals from the one or more sensors 16, the one or more images obtained by the one or more cameras 18, and/or other data related to the collision (e.g., time, date, and/or location of the collision) in the storage device 28 of the vehicle system 14. The processor 24 may additionally communicate the one or more signals, the one or more images, and/or other data related to the collision (e.g., time, date, and/or location of the collision) to another device or system, such as the computing system 50, via the communication device 22.

As discussed above with respect to FIG. 1, the vehicle 12 may include the data access device 34 to gather identifying information (e.g., from the mobile device 40 within the vehicle 38 and/or other mobile devices in the vicinity that may be carried by a witness to the collision). Once detected, the identifying information and/or other data related to the identifying information (e.g., time, date, and/or location for the RF signals) may be recorded in the storage device 28 of the vehicle system 14. The identifying information and/or other data related to the identifying information may additionally be communicated to another device or system, such as the computing system 50, via the communication device 22.

As shown, the vehicle 12 is parked in the vicinity of the one or more other properties 90, which may each have a respective security system 70. The security systems 70 may be authorized to be activated in response to the collision at the vehicle 12 and/or in response to any collisions detected within the vicinity. The security systems 70 may obtain one or more images of the environment surrounding the vehicle 12, for example. In some embodiments, the data access device 34 (or an additional data access device 34) may be provided at the other properties 90. The processor 54 of the computing system 50 may be configured to process and/or store data received from the vehicle system 14 and/or the one or more security systems 70, access data services, and/or provide alerts, as discussed above with respect to FIG. 1.

In some embodiments, the computing system 50 may be configured to adjust (e.g., reduce) an insurance cost associated with the other properties 90 in response to the authorization to activate the security systems 70 of the other properties 90. For example, the insurance cost associated with one of the other properties 90 may be higher without the owner granting authority to activate the security system 70 as part of the vehicle collision detection system 10, and the insurance cost associated with the one of the other properties 90 may be lower with the owner granting authority to activate the security system 70 as part of the vehicle collision detection system 10. A degree of insurance cost adjustment may vary based on features of the security system 70, such as number and location of the one or more cameras 84, features of the one or more cameras 84 (e.g., night vision), number and location of the one or more lights 86, or the like. In this way, the owner(s) of the other properties may reduce their insurance costs.

Figure 3:
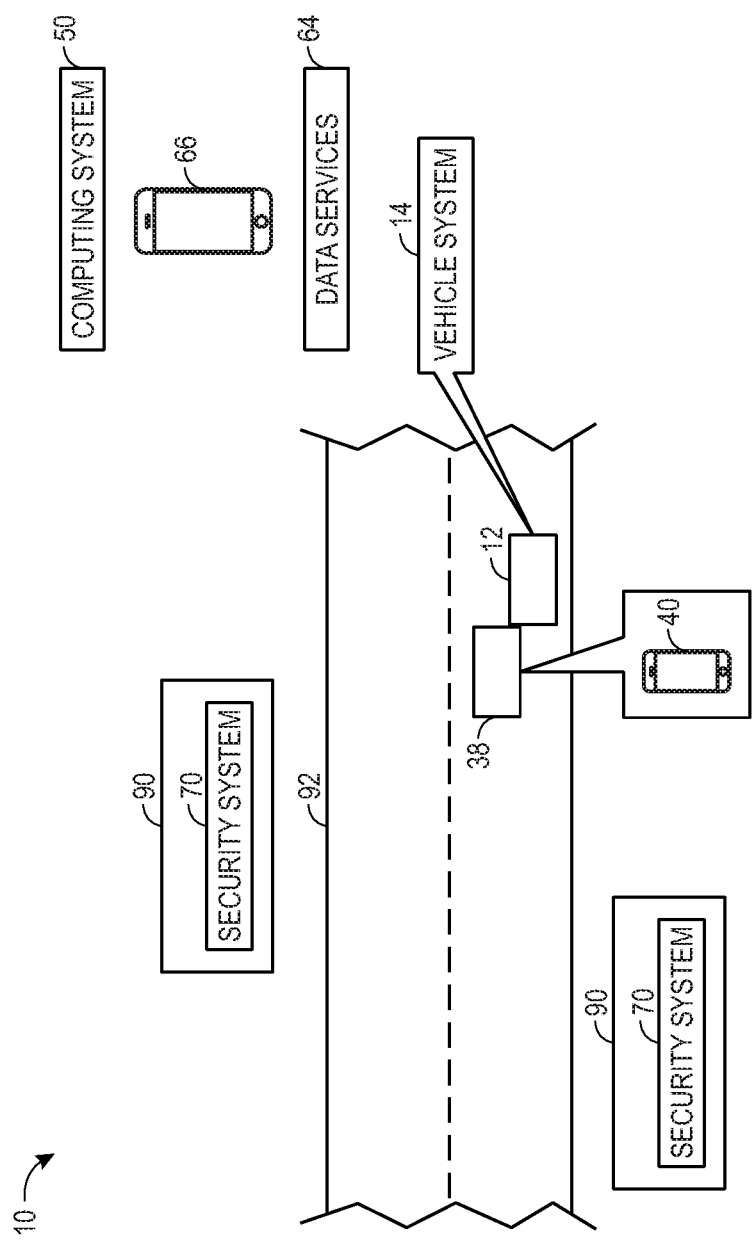
FIG. 3 is a schematic diagram of the vehicle collision detection system with the vehicle traveling along a road, in accordance with an aspect of the present disclosure.

FIG. 3 is a schematic diagram of the vehicle collision detection system 10 for use while the vehicle 12 is traveling (e.g., non-stationary, moving), such as along a road 92. As shown, the vehicle 12 is traveling along the road 92 in the vicinity of one or more other properties 90. The vehicle collision detection system 10 may include the vehicle system 14, the computing system 50, and/or one or more security systems 70 at the one or more other properties 90. The vehicle system 14, the computing system 50, and/or the one or more security systems 70 may include some or all of the components illustrated and described with respect to FIG. 1; however, these components are omitted in FIG. 3 for image clarity.

The vehicle system 14 may include the one or more sensors 16 that are configured to obtain data indicative of a collision, such as a collision between the other vehicle 38 and the vehicle 12. In particular, the one or more sensors 16 may generate one or more signals, which may be processed by the processor 24 of the vehicle system 14 and/or by the processor 54 of the computing system 50, to determine whether a collision has occurred. For example, the one or more sensors 16 may be one or more motion sensors, such as accelerometers and/or gyroscopes, which generate one or more signals indicative of motion of the vehicle 12. In such cases, if the vehicle 12 unexpectedly moves from a parked position at a stop light, the processors 24, 54 may determine that the collision has occurred. Thus, the processors 24, 54 may determine that the collision has occurred upon any motion of the vehicle 12. However, the processing steps may vary if the vehicle 12 is traveling. For example, if the vehicle 12 unexpectedly moves in a manner inconsistent with a force on an accelerator of the vehicle 12 and/or unexpectedly rotates in a manner inconsistent with a force on a steering wheel of the vehicle 12 while traveling, the processors 24, 54 may determine that the collision has occurred.

As another example, the one or more sensors may be one or more impact force sensors (e.g., embedded within the rear bumper, forward bumper, and/or side of the vehicle 12), which generate one or more signals indicative of an impact force on the vehicle 12. In such cases, if the vehicle 12 experiences an impact force above a first threshold (e.g., parked threshold) while in the parked position, the processors 24, 54 may determine that the collision has occurred. However, the vehicle 12 may experience some impact forces during typical travel, such as due to traveling over pot holes in the road 92 and/or impact from small debris (e.g., rocks, branches) in the road 92. Accordingly, only if the vehicle 12 experiences an impact force above a second threshold (e.g., traveling threshold) different (e.g., greater) than the first threshold while traveling, the processors 24, 54 may determine that the collision has occurred.

In response to detection of the collision, the processor 24 of the vehicle system 14 may activate the one or more cameras 18 and/or the one or more lights 20 to monitor an area around the vehicle 12. Additionally, the processor 24 may record the one or more signals from the one or more sensors 16, the one or more images obtained by the one or more cameras 18, and/or other data related to the collision (e.g., time, date, and/or location of the collision) in the storage device 28 of the vehicle system 14. The processor 24 may additionally communicate the one or more signals, the one or more images, and/or other data related to the collision (e.g., time, date, and/or location of the collision) to another device or system, such as the computing system 50, via the communication device 22.

As discussed above with respect to FIGS. 1 and 2, the vehicle 12 may include the data access device 34 to gather identifying information (e.g., from the mobile device 40 within the vehicle 38 and/or other mobile devices in the vicinity that may be carried by a witness to the collision). Once detected, the identifying information and/or other data related to the identifying information (e.g., time, date, and/or location for the RF signals) may be recorded in the storage device 28 of the vehicle system 14. The identifying information and/or other data related to the identifying information may additionally be communicated to another device or system, such as the computing system 50, via the communication device 22.

As shown, the vehicle 12 is traveling in the vicinity of the one or more other properties 90, which may each have a respective security system 70. The security systems 70 may be linked and/or authorized to be activated in response to the collision at the vehicle 12 and/or in response to any collisions detected within the vicinity. The security systems 70 may obtain one or more images of the environment surrounding the vehicle 12, for example. In some embodiments, the data access device 34 (or an additional data access device 34) may be provided at the other properties 90. The processor 54 of the computing system 50 may be configured to process and/or store data received from the vehicle system 14 and/or the one or more security systems 70, access data services, and/or provide alerts, as discussed above with respect to FIG. 1.

In some embodiments, the one or more sensors 16 may be configured to detect a nearby object (e.g., the person 36, another vehicle 38) prior to any collision with the vehicle 12. For example, the one or more sensors 16 may be proximity sensors, such as optical sensors and/or ultrasonic sensors. In response to the nearby object unexpectedly approaching the vehicle 12 (e.g., entering a buffer zone around the vehicle 12, such as the person 36 approaching the vehicle 12 while the vehicle 12 is parked overnight at the residential property 68 or the other vehicle 38 approaching the vehicle 12 while the vehicle 12 is traveling along the road 92), the vehicle collision detection system 10 may carry out the steps discussed above. For example, the one or more cameras 18 of the vehicle system 14 may be activated and/or the one or more cameras 84 of the security system 70 may be activated. In this way, the vehicle collision detection system 10 may begin obtaining data prior to the collision and may provide more information, such as additional witnesses to the collision and/or one or more images during the collision, as compared to only obtaining data in response to the collision.

Figure 4:
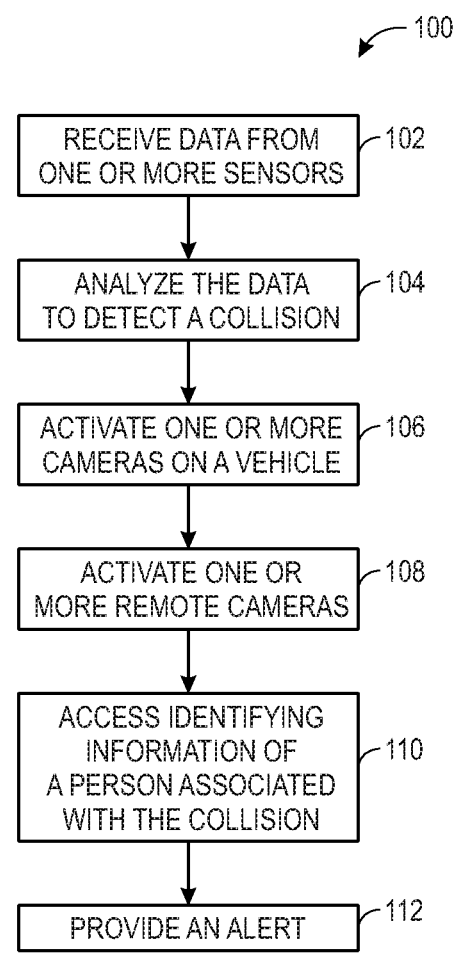
FIG. 4 is a flow diagram of a method of using the vehicle collision detection system, in accordance with an aspect of the present disclosure.

FIG. 4 is a flow diagram of a method 100 of using the vehicle collision detection system 10, in accordance with an aspect of the present disclosure. The following description of the method 100 will be described as being performed by the vehicle collision detection system 10. However, it should be noted that the steps of the method 100 may be performed by and/or distributed between components of the vehicle system 14, the computing system 50, and/or the security system 70, and/or any other suitable processor-based device. Moreover, although the following description of the method 100 is described in a particular order, it should be understood that the steps of the method 100 may be performed in any suitable order, certain steps of the method 100 may be omitted, and other steps may be added to the method 100.

In step 102, one or more processors of the vehicle collision detection system 10 may receive data from the one or more sensors 16 coupled to the vehicle 12. In step 104, the one or more processors may analyze the data to detect a collision at the vehicle 12. As discussed above, different processing steps and/or thresholds may be used depending on whether the vehicle 12 is in the parked position or traveling (e.g., stationary vs. nonstationary immediately prior to initial impact due to collision).

In step 106, in response to the collision at the vehicle 12, the one or more processors may provide control signals to activate the one or more cameras 18 coupled to the vehicle 12 to obtain one or more images of an environment surrounding the vehicle 12. The one or more cameras 18 may include a rotating camera, for example. As noted above, the one or more cameras 18 may be continuously activated, and the one or more processors may tag or otherwise identify relevant images around the time of the collision. In step 108, in response to the collision at the vehicle 12, the one or more processors may provide control signals to active one or more cameras 84 located remotely from the vehicle 12 to obtain one or more additional images of the environment surrounding the vehicle 12. The one or more cameras 84 may be part of a security system located at a property (e.g., the security system 70 located at the residential property 68 and/or another property 90). As noted above, other features (e.g., one or more lights) may also be activated in response to the collision at the vehicle 12.

In step 110, in response to the collision at the vehicle 12, the one or more processors may access identifying information of a person associated with the collision using the data access device 34. One or more data access devices 34 may be coupled to the vehicle 12, a property (e.g., the residential property 68 and/or another property 90), or both. In step 112, in response to the collision at the vehicle 12, the one or more processors are configured to provide an alert to a person associated with the vehicle 12, to emergency services personnel, or both.

While only certain features of the disclosure have been illustrated and described herein, many modifications and changes will occur to those skilled in the art. It is, therefore, to be understood that the appended claims are intended to cover all such modifications and changes as fall within the true spirit of the disclosure. It should be appreciated that features discussed with respect to FIGS. 1-4 may be combined in any suitable manner.

The invention claimed is:

1. A vehicle collision detection system, comprising:
one or more processors configured to:
  receive data from one or more sensors coupled to a vehicle;
  analyze the data to detect a collision at the vehicle;
  in response to detecting the collision at the vehicle:
    provide control signals to activate one or more cameras coupled to the vehicle to obtain one or more images of an environment surrounding the vehicle;
    provide additional control signals to automatically activate a data access device coupled to the vehicle, wherein the data access device comprises one or more radio frequency (RF) sensors configured to detect and measure one or more RF signals of a mobile device associated with a person located in a vicinity of the vehicle;
    determine a location of the mobile device and identifying information associated with the person based on the one or more RF signals; and
    store the location in conjunction with the identifying information.

2. The vehicle collision detection system of claim 1, wherein, in response to detecting the collision at the vehicle, the one or more processors are configured to activate one or more remote cameras located remotely from the vehicle to obtain one or more additional images of the environment surrounding the vehicle.

3. The vehicle collision detection system of claim 2, wherein the one or more processors are configured to adjust an insurance cost associated with the vehicle in response to activation of the one or more remote cameras upon detection of any collision at the vehicle.

4. The vehicle collision detection system of claim 3, wherein the one or more remote cameras are located at a property that is a residence of a person associated with the vehicle.

5. The vehicle collision detection system of claim 1, wherein the one or more processors are configured to access a data service based on the identifying information to identify additional information about the person in the vicinity of the vehicle.

6. The vehicle collision detection system of claim 1, wherein, in response to detecting the collision at the vehicle, the one or more processors are configured to provide an alert to a driver of the vehicle, a person associated with the vehicle, to emergency services personnel, or any combination thereof, wherein the alert comprises an indication of the location, the identifying information, or both.

7. The vehicle collision detection system of claim 1, wherein the one or more processors are configured to analyze the data to detect the collision at the vehicle by comparing an impact force at the vehicle to one or more thresholds.

8. The vehicle collision detection system of claim 7, wherein the one or more thresholds comprise a first threshold for use when the vehicle is stationary and a second threshold for use when the vehicle is traveling.

9. The vehicle collision detection system of claim 1, wherein the one or more cameras comprise a rotational camera configured to rotate 360 degrees relative to the vehicle.

10. The vehicle collision detection system of claim 1, wherein the collision comprises glass breakage, and the one or more processors are configured to analyze the data to detect the glass breakage.

11. A vehicle collision detection system, comprising:
one or more sensors coupled to a vehicle;
one or more remote cameras located remotely from the vehicle; and
one or more processors configured to:
receive data from the one or more sensors;
analyze the data to detect an object within a buffer zone surrounding the vehicle; and
in response to detecting the object within the buffer zone surrounding the vehicle:
provide control signals to activate the one or more remote cameras to obtain one or more images of an environment surrounding the vehicle and automatically activate a data access device coupled to the vehicle, wherein the data access device comprises one or more radio frequency (RF) sensors configured to detect and measure one or more first RF signals of a first mobile device associated with a driver of the vehicle and one or more second RF signals of a second mobile device associated with an another person in a vicinity of the vehicle;
based on the one or more first RF signals, determine a first location of the first mobile device and first identifying information associated with the driver, and based on the one or more second RF signals, determine a second location of the second mobile device and second identifying information associated with the another person; and
store the first location in conjunction with the first identifying information and the second location in conjunction with the second identifying information.

12. The vehicle collision detection system of claim 11, wherein the one or more processors are configured to adjust an insurance cost associated with the vehicle in response to receipt of authorization to activate the one or more remote cameras.

13. The vehicle collision detection system of claim 11, wherein the one or more processors are configured to adjust an insurance cost associated with a property at which the one or more remote cameras are located in response to receipt of authorization to activate the one or more remote cameras.

14. The vehicle collision detection system of claim 11, comprising one or more cameras coupled to the vehicle, wherein, in response to detecting the object within the buffer zone surrounding the vehicle, the one or more processors are configured to activate the one or more cameras to obtain one or more additional images of the environment surrounding the vehicle.

15. The vehicle collision detection system of claim 11, wherein, in response to detecting the object within the buffer zone surrounding the vehicle, the one or more processors are configured to provide an alert to the driver, a person associated with the vehicle, to emergency services personnel, or any combination thereof, and wherein the alert comprises the first location, the second location, the first identifying information, the second identifying information, or any combination thereof.

16. The vehicle collision detection system of claim 15, wherein the one or more processors are configured to access a data service based on the second identifying information to identify additional information about the another person in the vicinity of the vehicle.

17. The vehicle collision detection system of claim 11, wherein, in response to detecting the object within the buffer zone surrounding the vehicle, the one or more processors are configured to provide the control signals to adjust an orientation of the one or more remote cameras to enable the one or more remote cameras to obtain the one or more images of the environment surrounding the vehicle.

18. A method of operating a vehicle collision detection system, the method comprising:
receiving, at one or more processors, data from one or more sensors coupled to a vehicle;
analyzing, using the one or more processors, the data to detect a collision at the vehicle; and
in response to detecting the collision at the vehicle and using the one or more processors:
providing control signals to activate one or more cameras coupled to the vehicle to obtain one or more images of an environment surrounding the vehicle, to activate one or more remote cameras located remotely from the vehicle to obtain one or more additional images of the environment surrounding the vehicle, to provide an alert to a first mobile device associated with a driver of the vehicle, and to automatically activate a data access device coupled to the vehicle, wherein the data access device comprises one or more radio frequency (RF) sensors configured to detect and measure one or more RF signals of a second mobile device associated with a person in a vicinity of the vehicle;
determining a location of the second mobile device and identifying information of the person from the one or more RF signals, wherein the alert comprises an indication of the collision, the location, the identifying information, or any combination thereof; and
storing the location in association with the identifying information in a data storage device associated with the vehicle.

19. The method of claim 18, wherein the one or more processors are configured to receive additional data comprising a time, a date, or both associated with the data, the one or more images, the one or more additional images, the one or more RF signals, or any combination thereof, and wherein the one or more processors are configured to store the additional data in the data storage device.

20. The vehicle collision detection system of claim 1, comprising a data storage device coupled to the vehicle, wherein the one or more processors are configured to store the location in conjunction with the identifying information in the data storage device.

* * * * *